United States Patent
Zivkovic

[19]
[11] Patent Number: 6,006,421
[45] Date of Patent: Dec. 28, 1999

[54] DEVICE FOR PRESSING A PREASSEMBLED BALL JOINT CARTRIDGE INTO A BEARING EYE OF A TIE ROD END

[75] Inventor: Milorad Zivkovic, Filderstadt, Germany

[73] Assignee: DaimlerChrysler AG, Germany

[21] Appl. No.: 09/008,832

[22] Filed: Jan. 20, 1998

[30] Foreign Application Priority Data

Jan. 17, 1997 [DE] Germany ............... 197 01 501

[51] Int. Cl.⁶ ....................... B30B 1/08
[52] U.S. Cl. ............. 29/725; 29/243.517; 29/441.1
[58] Field of Search ............ 29/898.049, 898.045, 29/898.048, 898.051, 724, 725, 243.5, 243.517, 441.1

[56] References Cited

U.S. PATENT DOCUMENTS

| | | | |
|---|---|---|---|
| 4,286,363 | 9/1981 | Morin | 29/101 |
| 4,504,166 | 3/1985 | Morin | |
| 5,058,415 | 10/1991 | Blase et al. | 72/400 |
| 5,380,114 | 1/1995 | Urbach | |

FOREIGN PATENT DOCUMENTS

| | | |
|---|---|---|
| 2008935 | 9/1971 | Germany |
| 2111138 | 9/1971 | Germany |
| 2756228A1 | 7/1978 | Germany |
| 4445251A1 | 1/1996 | Germany |
| 19646233A1 | 6/1996 | Germany |

OTHER PUBLICATIONS

European Search Report May 22, 1998.

*Primary Examiner*—S. Thomas Hughes
*Assistant Examiner*—Essama Omgba
*Attorney, Agent, or Firm*—Evenson, McKeown, Edwards & Lenahan, P.L.L.C.

[57] ABSTRACT

An apparatus is used for pressing a preassembled ball joint cartridge into a bearing eye of a tie rod end, with the ball joint cartridge comprising a ball joint pin, a bearing shell surrounding the joint ball, and a bearing housing that surrounds the bearing shell and is pressed into the bearing eye. In order to be able to press a joint cartridge of this type reliably, exactly, and efficiently into an unmachined bearing eye, the apparatus performs the following procedures. The tie rod end with the bearing eye is placed on a receiving device located on a press table. The ball joint cartridge is placed with its bearing housing in the bearing eye in such fashion that initially only the bearing shell in the end conical area engages, with contact, a matching opposite cone of the bearing eye, while the bearing housing of the joint cartridge still has play in the bearing eye. The bearing eye is centered coaxially with respect to a pressing device and aligned axially and perpendicularly with respect thereto. The free end of the pin shaft of the ball joint pin is centered coaxially with respect to the centering device and the pin shaft is pretensioned axially in the pressing device in such fashion that the bearing shell is locked axially in the bearing eye by the ball joint pin. A pressing member of the pressing device is pressed against the bearing housing and presses the housing into the bearing eye.

18 Claims, 4 Drawing Sheets

DEVICE FOR PRESSING A PREASSEMBLED BALL JOINT CARTRIDGE INTO A BEARING EYE OF A TIE ROD END

BACKGROUND AND SUMMARY OF THE INVENTION

This application claims the priority of German application 197 01 501.8-12 filed in Germany on Jan. 17, 1997, the disclosure of which is expressly incorporated by reference herein.

The invention relates to a method and a device for pressing a preassembled ball joint cartridge into a bearing eye of a tie rod end.

German Patent Document DE 44 45 251 A1 shows a mounting arrangement for a ball joint cartridge in a tie rod end of a motor vehicle. The tie rod is made from Thixocasting, an aluminum with a high degree of toughness. The receiving opening and/or bearing eye in the tie rod end, into which the bearing housing of the ball joint cartridge is inserted, is not machined. The prefabricated ball joint cartridge is pressed axially as a unit into the receiving opening and/or bearing eye of the tie rod end.

Reference is made herein to the general prior art in German Patent Document DE AS 20 08 935, DE-OS 27 56 228, and DE-OS 2 111 138.

The present invention is intended to provide a method and a device of the species recited at the outset for pressing a preassembled ball joint cartridge into place, so that the pressing process proceeds safely, efficiently, and simply, and friction-optimized and zero-play support for the bearing ball can nevertheless be achieved following the pressing process. Unless necessary, no previous machining is required for the bearing eye of the tie rod end, with it being intended instead to be used in the unfinished state.

According to the invention these and other objects are achieved by providing a device and process for pressing a preassembled ball joint cartridge into a bearing eye of a tie rod end, said ball joint cartridge comprising a ball joint pin, a bearing shell surrounding the joint ball, and a bearing housing that surrounds the bearing shell and is pressed into the bearing eye, the method comprising the steps of placing the tie rod end together with the bearing eye on a receiving device located on a press table; inserting the ball joint cartridge bearing housing into the bearing eye in such fashion that initially only the bearing shell fits with contact in an endwise conical area into a matching cone of the bearing eye, while the bearing housing of the joint cartridge still has axial play in the bearing eye; centering the bearing eye coaxially with respect to a pressing device aligned axially and perpendicularly thereto; centering a free end of a pin shaft of the ball joint pin coaxially with respect to the pressing device and pretensioning the pin shaft axially in the pressing direction in such fashion that the bearing shell is secured axially in the bearing eye by the ball joint pin; and pressing a pressing member of the pressing device against the bearing housing to thereby press said housing into bearing eye.

As a result of the method and device according to the invention, a preassembled ball joint cartridge can be pressed precisely and without considerable effort into the bearing housing of a tie rod end. This results in a higher degree of process safety and manufacturing quality of the joint during assembly.

Advantageously, the method can be used for tie rods that exhibit a corresponding elasticity or toughness that permits the bearing housing of the ball joint cartridge to be pressed into place. These include for example tie rods made of aluminum or aluminum alloy which can therefore remain unmachined.

Other objects, advantages and novel features of the present invention will become apparent from the following detailed description of the invention when considered in conjunction with the accompanying drawings.

DETAILED DESCRIPTION OF THE INVENTION

Figure 1:
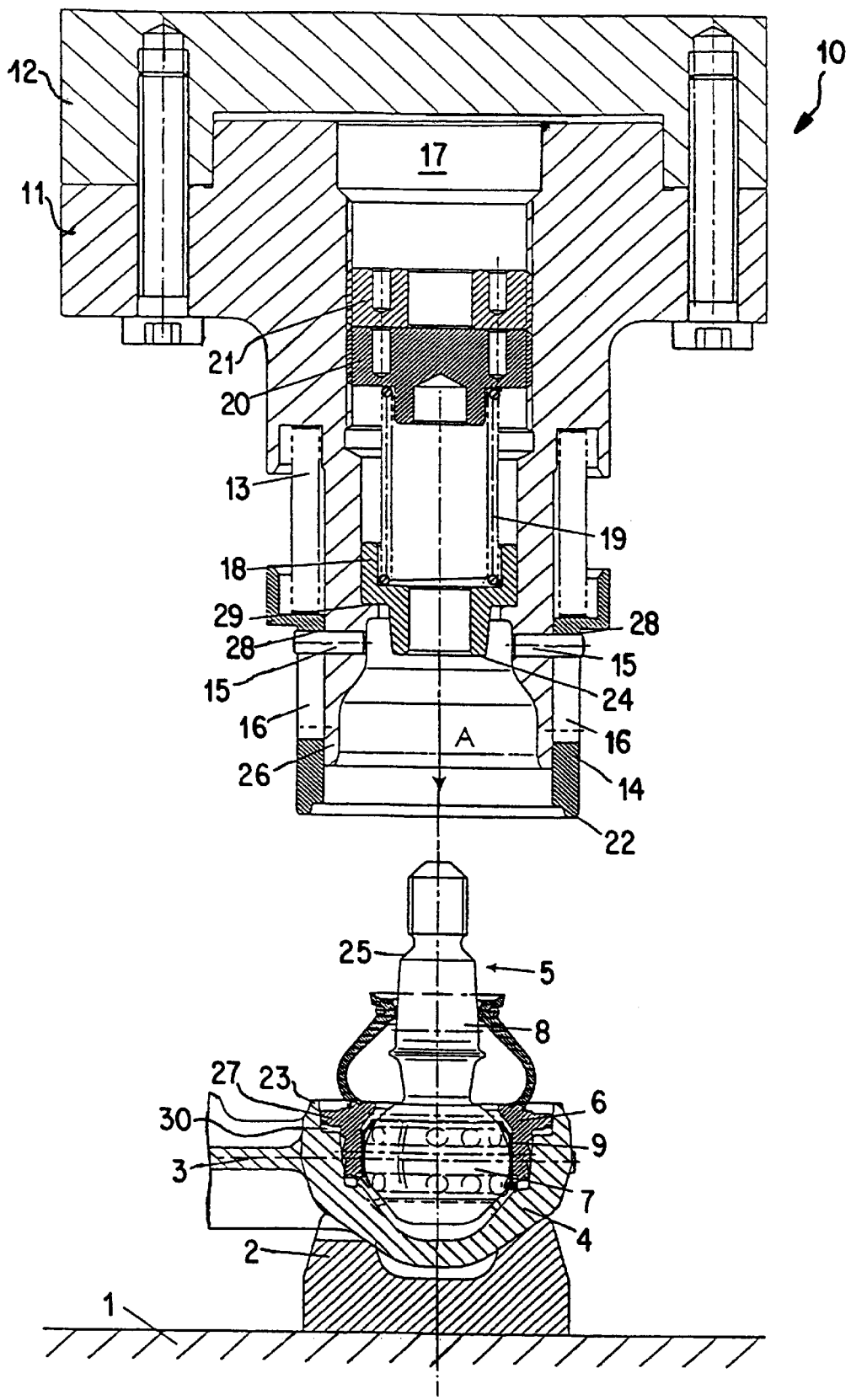
FIG. 1 shows a device for practicing the method according to the invention, shown in the starting position.
Figure 2:
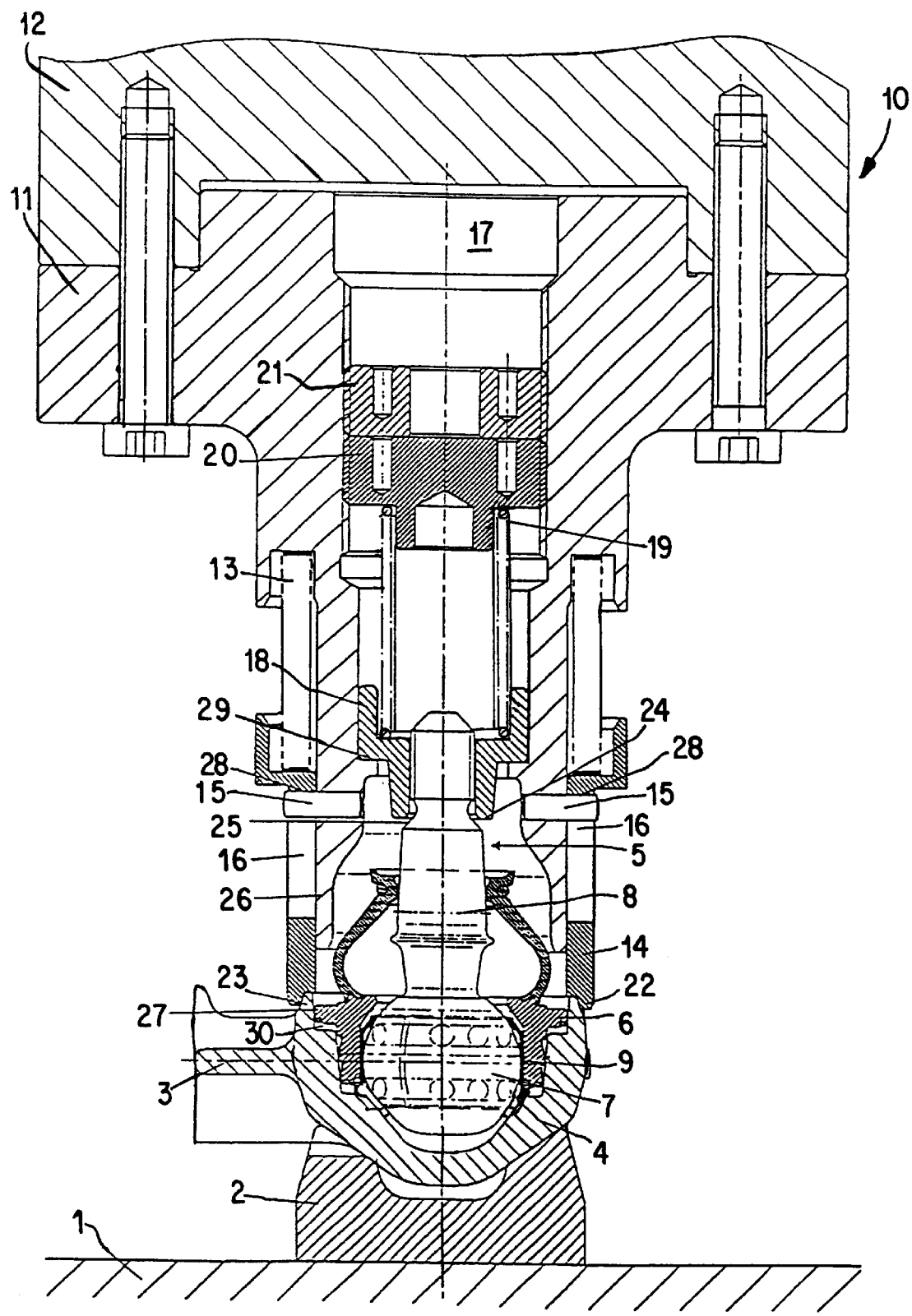
FIG. 2 shows the device according to FIG. 1 with the pressing device centering a tie rod into whose bearing eye a ball joint cartridge is to be pressed.
Figure 3:
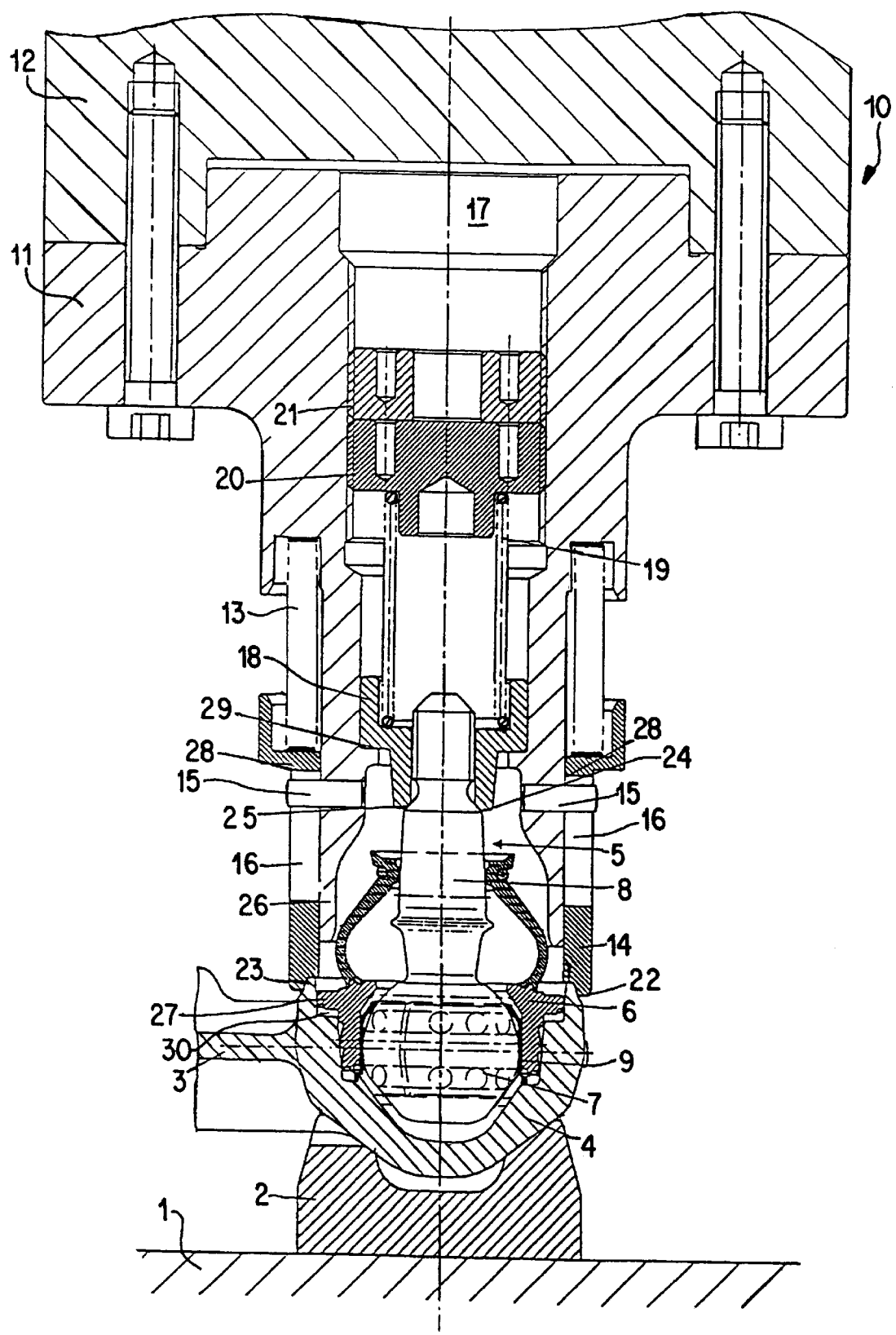
FIG. 3 shows the device according to FIG. 1, with the pressing device centering the ball joint cartridge.

The device shown in FIGS. 1 to 4 has a press table 1 on which a receiving device 2 is located. A tie rod 3 is placed on receiving device 2. A bearing eye 4 of tie rod 3 has an outer contour that matches the curved inner contour of receiving device 2. To press a ball joint cartridge 5 into the preferably unmachined bearing eye 4 of tie rod 3 made of an aluminum material, the link together with its bearing housing 6 is placed in bearing eye 4 of tie rod 3 without exerting pressure. The ball joint cartridge is designed as a preassembled module with a ball joint pin 5 provided with a joint ball 7 and a bolt shaft 8 abutting said ball and made in one piece with joint ball 7. A bearing shell 9 that receives the joint ball is placed in bearing housing 6 axially displaceably or with zero play.

A pressing device 10 is used to press the ball joint cartridge into place, said device 10 having a pressing member 11 linked by a screw connection with a base part 12 of pressing device 10. Base part 12 can be a hydraulic press for example. A centering sleeve 14 is connected coaxially to the lengthwise axis of pressing device 10 by means of a coil spring 13 as a spring device. Centering sleeve 14 is guided axially on pressing member 11, with axial travel being limited by guide pins 15, said pins being distributed over the circumference and preferably consisting of two pins located diametrically opposite one another, projecting radially outward from pressing member 11. Guide pins 15 fit into axial grooves 16 of centering sleeve 14 by their projecting parts. The axial ends of the axial grooves 16 together with guide pins 15 constitute stop members that will be described in greater detail below and which serve to limit the travel of centering sleeve 14.

Guide pins 15, guided in axial grooves 16, simultaneously also serve to prevent centering sleeve 14 from rotating.

A central internal bore 17 of pressing member 11 contains another centering member in the form of a centering bell 18. Centering bell 18 is likewise connected axially displaceably with pressing member 11 by a coil spring 19 as a spring device and is guided coaxially with respect to the lengthwise axis of pressing device 10 by the bore wall of bore 17. In the rear area of bore 17 facing away from centering bell 18, the bore is made in the form of a threaded bore into which an adjusting nut 20 can be screwed for adjustable travel and force limitation for centering bell 18. A locknut 21 serves to secure adjusting nut 20.

Before the pressing process, centering sleeve 14 abuts pins 15 by the rear ends 28 of axial grooves 16, while centering bell 18 abuts an internal projection 29 in bore 17. In this manner, stop members are formed before the pressing process begins for centering sleeve 14 and centering bell 18.

The device for pressing ball joint cartridge 5 into bearing 4 operates as follows:

After the ball joint cartridge with ball joint pin 5, as shown in FIG. 1, has been placed in bearing eye 4, with the conical bottom of bearing eye 4 being contacted only by the conical area of the end of bearing shell 9, pressing device 10 is lowered in the direction of arrow A. As a result, as can be seen from FIG. 2, centering sleeve 14 initially comes in contact with an endwise conical projection 22 on the free end 23 of bearing eye 4. The end projection 22 and end 23 of bearing eye 4 are formed relative to one another in terms of their diameters and annular projections such that bearing eye 4 and hence tie rod end 3 are centered as a result of the lowering of the pressing device, with spring device 13 setting an appropriate pretension so that centering sleeve 14 can be inserted against the pretension of the spring during the subsequent downward movement of pressing device 10.

During the further movement of pressing device 10 in the direction of arrow A, centering bell 18 abuts a forward conical end 24 at a shoulder 25 of bolt shaft 8, with bolt shaft 8 being guided by its end area in a bore of centering bell 18. As a result of the cooperation between end edge 24, which abuts spring 19 laterally under pretension 1, and shoulder 25, ball joint pin 5 and bearing shell 9 are pressed axially with respect to the lengthwise axis of pressing device 10 into the bottom of bearing eye 4. In this manner, bearing eye 4 and ball joint pin 8/7, together with bearing shell 9, are centered exactly with respect to one another and locked in place so that during the following pressing process, they no longer change their positions but retain this specified position.

Figure 4:
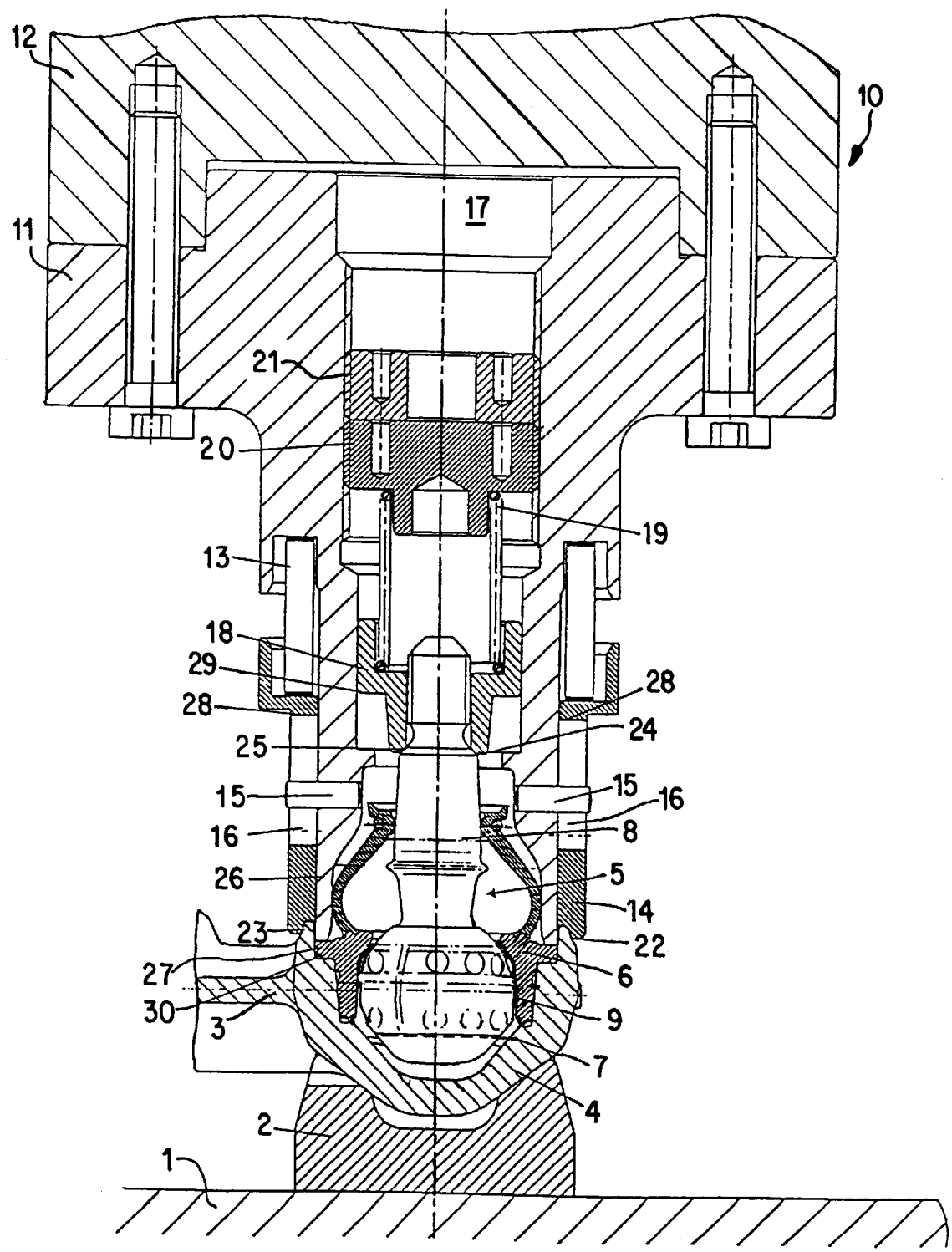
FIG. 4 shows the device according to FIG. 1, with the pressing device pressing the ball joint cartridge completely into the bearing eye.

As shown in FIG. 4, pressing device 10 is lowered even further in the last step, with the anterior endwise annular end 26 of pressing member 11 coming to rest on an annular projection 27 of bearing housing 6. Lowering pressing device 10 further causes pressing member 11 to press bearing housing 6 into bearing eye 4, so that bearing housing 6 comes to rest with its annular projection on an annular projection 30 of bearing eye 4.

After the pressing process is terminated, pressing device 10 is returned to its starting position and it is merely necessary to crimp bearing eye 4 inward at its projection or end 23 to secure the ball joint cartridge in place.

As can be seen, the ball joint cartridge is pressed into bearing eye 4 of tie rod end 3 with a single stroke but in a multistage process,. Bearing eye 4 has an inside diameter smaller than the outside diameter of bearing housing 6, so that during the pressing process, because of the low material strength of bearing eye 4 by comparison with that of bearing housing 9, a sizing process takes place in the unmachined bearing eye.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Apparatus for pressing a preassembled ball joint cartridge into a bearing eye of a tie rod end, said ball joint cartridge including a ball joint pin, a bearing shell, surrounding a joint ball of the ball joint pin, and a bearing housing surrounding the bearing shell which in an assembled condition is pressed into the bearing eye, said apparatus comprising:

a press table with a receiving device for supporting the bearing eye, a pressing member which is forcibly movable with respect to the receiving device for pressing the ball joint cartridge into the bearing eye, a first centering member carried by the pressing member and axially movable with respect to the pressing member against a force of a first resilient member, said first centering member being engageable against the bearing eye supported in the receiving device, and a second centering member carried by the pressing member and axially movable with respect to the pressing member against a force of a second resilient member, said second centering member being engageable against the ball joint pin, wherein said pressing member is forcibly pressable against the bearing housing to press the bearing housing into an assembled condition in the bearing eye while said centering members center the bearing eye and the ball joint pin.

2. Apparatus according to claim 1, wherein the first centering member and second centering member each have stop members such that during the pressing process, the first centering member enters a centering position first, then the second centering member enters a centering position, and finally the pressing member enters a working position pressing the bearing housing in the bearing eye.

3. Apparatus according to claim 2, wherein the stop members of the first centering member are designed as guide pins that also offer protection against twisting.

4. Apparatus according to claim 3, wherein the second centering member is designed in the shape of a bell that engages a shoulder located on a pin shaft of the ball joint pin.

5. Apparatus according to claim 4, wherein the second resilient member includes a supporting shoulder on the pressing member side which can be adjusted axially by adjusting members for axial pretensioning of the second centering member.

6. Apparatus according to claim 4, wherein said second centering member is a second sleeve and the second resilient member is a spring disposed coaxially to the second sleeve and to the pressing direction of said pressing member.

7. Apparatus according to claim 3, wherein the second resilient member includes a supporting shoulder on the pressing member side which can be adjusted axially by adjusting members for axial pretensioning of the second centering member.

8. Apparatus according to claim 3, wherein said first centering member is a first sleeve and the first resilient member is a spring disposed coaxially to the first sleeve and to the pressing direction of said pressing member.

9. Apparatus according to claim 8, wherein said second centering member is a second sleeve and the second resilient member is a spring disposed coaxially to the second sleeve and to the pressing direction of said pressing member.

10. Apparatus according to claim 2, wherein the second centering member is designed in the shape of a bell that engages a shoulder located on a pin shaft of the ball joint.

11. Apparatus according to claim 10, wherein the second resilient member includes a supporting shoulder on the pressing member side which can be adjusted axially by adjusting members for axial pretensioning of the second centering member.

12. Apparatus according to claim 10, wherein said second centering member is a second sleeve and the second resilient member is a spring disposed coaxially to the second sleeve and to the pressing direction of said pressing member.

13. Apparatus according to claim 12, wherein said second centering member is a second sleeve and the second resilient member is a spring disposed coaxially to the second sleeve (18) and to the pressing direction of said pressing member.

14. Apparatus according to claim 2, wherein said first centering member is a first sleeve and the first resilient member is a spring disposed coaxially to the first sleeve and to the pressing direction of said pressing member.

15. Apparatus according to claim 2, wherein the second resilient member includes a supporting shoulder on the pressing member side which can be adjusted axially by adjusting members for axial pretensioning of the second centering member.

16. Apparatus according to claim 15, wherein said first centering member is a first sleeve and the first resilient member is a spring disposed coaxially to the first sleeve and to the pressing direction of said pressing member.

17. Apparatus according to claim 16, wherein said second centering member is a second sleeve and the second resilient member is a spring disposed coaxially to the second sleeve and to the pressing direction of said pressing member.

18. Apparatus according to claim 15, wherein said second centering member is a second sleeve and the second resilient member is a spring disposed coaxially to the second sleeve and to the pressing direction of said pressing member.

* * * * *